(12) United States Patent
Kamigaki et al.

(10) Patent No.: US 8,097,551 B2
(45) Date of Patent: Jan. 17, 2012

(54) DIELECTRIC CERAMIC AND CAPACITOR

(75) Inventors: Kousei Kamigaki, Kirishima (JP); Daisuke Fukuda, Kirishima (JP)

(73) Assignee: Kyocera Corporation, Kyoto (JP)

( * ) Notice: Subject to any disclaimer, the term of this patent is extended or adjusted under 35 U.S.C. 154(b) by 377 days.

(21) Appl. No.: 12/375,386

(22) PCT Filed: Jul. 26, 2007

(86) PCT No.: PCT/JP2007/064702
§ 371 (c)(1),
(2), (4) Date: Mar. 25, 2009

(87) PCT Pub. No.: WO2008/013236
PCT Pub. Date: Jan. 31, 2008

(65) Prior Publication Data
US 2009/0207556 A1    Aug. 20, 2009

(30) Foreign Application Priority Data
Jul. 27, 2006   (JP) ................................ 2006-205100

(51) Int. Cl.
*C04B 35/468*   (2006.01)
(52) U.S. Cl. ..................................... 501/139; 361/321.4

(58) Field of Classification Search .................. 501/139; 361/321.4
See application file for complete search history.

(56) References Cited

U.S. PATENT DOCUMENTS

| | | | | |
|---|---|---|---|---|
| 5,010,443 A | * | 4/1991 | Maher ......................... | 361/321.4 |
| 6,917,513 B1 | * | 7/2005 | Kim et al. ................... | 361/321.2 |
| 7,567,428 B2 | * | 7/2009 | Sohn et al. .................. | 361/321.4 |

FOREIGN PATENT DOCUMENTS

| | | | |
|---|---|---|---|
| JP | 04-349168 | | 12/1992 |
| JP | 2003-040671 | | 2/2003 |
| JP | 2005-217000 | | 8/2005 |
| JP | 2005-255461 | | 9/2005 |
| JP | 2005255461 | * | 9/2005 |
| JP | 2008297133 | * | 12/2008 |

OTHER PUBLICATIONS

Nagai et al., "Effect of MgO Doping on the Phase Transformations of $BaTiO_3$" J. Am. Ceram. Soc., vol. 83 (1), pp. 107-112 (2000).

* cited by examiner

*Primary Examiner* — Karl Group
(74) *Attorney, Agent, or Firm* — Birch, Stewart, Kolasch & Birch, LLP

(57) ABSTRACT

The invention relates to a ceramic dielectric material and to capacitors including the ceramic dielectric material. The ceramic dielectric material of the invention exhibits a high relative dielectric constant and a stable temperature characteristic of the relative dielectric constant.

9 Claims, 4 Drawing Sheets

(a)

(b)

(a)

(b)

DIELECTRIC CERAMIC AND CAPACITOR

TECHNICAL FIELD

The present invention relates to a dielectric ceramic and a capacitor, in particular, to a dielectric ceramic including crystal grains containing barium titanate as a main component and a capacitor including the dielectric ceramic.

BACKGROUND ART

Digital electronic devices such as mobile computers and cellular phones are now becoming increasingly common. Nationwide digital terrestrial broadcasting will start in the near future in Japan. Digital electronic devices include many LSIs. Existing television receivers with cathode ray tubes are being replaced by liquid crystal displays or plasma displays.

Power source circuits of such digital electronic devices include capacitors for bypassing. A preferred example of such capacitors is a multilayer ceramic capacitor formed of a dielectric ceramic with a high relative dielectric constant containing barium titanate as a main component. Such a capacitor can have a small size and a high capacitance, and has a stable temperature characteristic of capacitance (or a relative dielectric constant) (See Patent Document 1 and 2, and non-patent document 1).

However, since dielectric ceramics, disclosed in patent document 1 and 2 and non-patent document 1, with high relative dielectric constants containing barium titanate as main components inherently include crystals having ferro-electricity, such dielectric ceramics have large temperature dependent variations of the relative dielectric constants, which has been a problem Patent Document 1: Japanese Patent Application Laid-Open No. 2003-40671
Patent Document 2: Japanese Patent Application Laid-Open No. 2005-217000
Non-Patent Document 1: Toru NAGAI, Kenji IIJIMA, Hae Jin HWANG, Mutsuo SANDO, Tohru SEKINO & Koichi NIIHARA, "Effect of MgO doping on the Phase Transformation of $BaTiO_3$," JOURNAL OF AMERICAN CERAMIC SOCIETY 83 [1], 2000, pp. 107-112

DISCLOSURE OF INVENTION

Problems to be Solved by the Invention

A problem solved by the present invention is to provide a dielectric ceramic that exhibits a high relative dielectric constant and a stable temperature characteristic of the relative dielectric constant; and a capacitor including the dielectric ceramic.

Means for Solving the Problem

The inventors of the present invention have studied hard to solve the above problem and have found that a dielectric ceramic exhibits a high relative dielectric constant and a stable temperature characteristic of the relative dielectric constant when crystal grains thereof containing barium titanate as a main component also contain magnesium and a rare-earth element in specific composition ranges, have a crystal structure of a cubic system, and have a mean grain diameter of 100 to 145 nm. Thus, the inventors have accomplished the present invention.

According to a present invention, a dielectric ceramic comprises crystal grains containing barium titanate as a main component and magnesium and a rare-earth element. The dielectric ceramic contains 0.02 to 0.064 moles of magnesium in terms of MgO and 0.01 to 0.06 moles of the rare-earth element (RE) in terms of $RE_2O_3$ per mole of barium constituting the dielectric ceramic. The crystal grains have a crystal structure of a cubic system and the crystal grains have a mean diameter of 100 to 145 nm.

The dielectric ceramic preferably contains 0.02 to 0.04 moles of magnesium in terms of MgO, 0.01 to 0.03 moles of the rare-earth element (RE) in terms of $RE_2O_3$, and 0 to 0.01 moles of manganese in terms of MnO per mole of barium constituting the dielectric ceramic and the crystal grains may have a mean diameter of 115 to 145 nm.

A capacitor according to a present invention comprises a laminate including dielectric layers and conductor layers disposed alternately. The dielectric layers include the above-mentioned dielectric ceramic.

EFFECTS OF THE INVENTION

A dielectric ceramic according to the present invention includes crystal grains containing barium titanate as a main component and magnesium and a rare-earth element in the above-mentioned composition ranges. The crystal grains have a crystal structure of a cubic system and the crystal grains have a mean diameter of 100 to 145 nm. As a result, such a dielectric ceramic can have a high relative dielectric constant and a stable temperature characteristic of the relative dielectric constant. Specifically, the dielectric ceramic according to the present invention has two (local maximum) peaks in a curve representing a variation of the relative dielectric constant thereof in the temperature range of −55° C. to 125° C. Thus, such a dielectric ceramic can exhibit a relative dielectric constant $C_{25}$ at 25° C. of 650 or more and a variation of the relative dielectric constant within ±10% in the temperature range of −55° C. to 125° C. where the relative dielectric constant at 25° C. is used as a standard.

When the dielectric ceramic according to the present invention contains 0.02 to 0.04 moles of magnesium in terms of MgO, 0.01 to 0.03 moles of the rare-earth element (RE) in terms of $RE_2O_3$, and 0 to 0.01 moles of manganese in terms of MnO per mole of barium constituting the dielectric ceramic; and the crystal grains have a mean diameter of 115 to 145 nm, the dielectric ceramic can exhibit a higher relative dielectric constant and a smaller variation of the relative dielectric constant in the temperature range of −55° C. to 125° C. where the relative dielectric constant at 25° C. is used as a standard.

A capacitor according to the present invention includes, as dielectric layers, such a dielectric ceramic that exhibits a high relative dielectric constant and a stable temperature characteristic of the relative dielectric constant. Such a capacitor can have a higher capacitance and a more stable temperature characteristic of capacitance than known capacitors.

PREFERRED EMBODIMENTS FOR CARRYING OUT THE INVENTION

Figure 1:
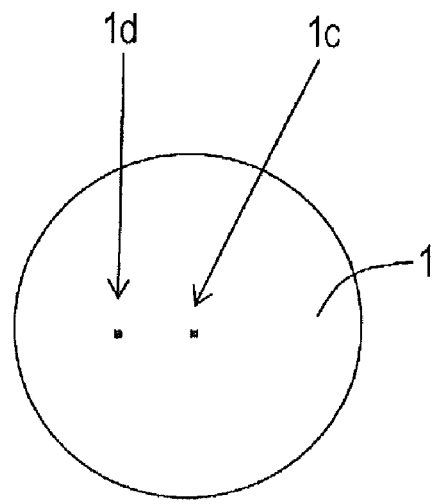
FIG. 1 is a schematic section view of a crystal grain constituting a dielectric ceramic according to the present invention.

A dielectric ceramic according to the present invention contains barium titanate as a main component, which is represented by a chemical formula $BaTiO_3$ and has a perovskite crystal structure. Specifically a dielectric ceramic according to a present invention comprises crystal grains containing barium titanate as a main component and magnesium and a rare-earth element. Also the dielectric ceramic contains 0.02 to 0.064 moles of magnesium in terms of MgO and 0.01 to 0.06 moles of the rare-earth element (RE) in terms of $RE_2O_3$ per mole of barium constituting the dielectric ceramic. The crystal grains have a crystal structure of a cubic system and have a mean diameter of 100 to 145 nm.

As described below, a dielectric ceramic having a specific composition, a specific crystal structure and a grain diameter in the specific range above can exhibit a relative dielectric constant of 650 or more at room temperature (25° C.) and a variation of the relative dielectric constant within ±10% in the temperature range of −55° C. to 125° C.

Specifically, when a dielectric ceramic contains 0.02 or more of magnesium in terms of MgO per mole of barium, crystal grains containing barium titanate as a main component can form a solid solution with large amounts of magnesium. This is advantageous because the crystal structure can be changed into a cubic system and the insulating properties of the dielectric ceramic can be enhanced.

When a dielectric ceramic contains 0.064 moles or less of magnesium in terms of MgO per mole of barium, crystal grains containing barium titanate as a main component contain a low amount of magnesium as an impurity and the crystal grains can maintain a perovskite crystal structure. Thus, the dielectric ceramic can exhibit a high relative dielectric constant.

When a dielectric ceramic contains 0.01 moles or more of a rare-earth element (RE) in terms of $RE_2O_3$ per mole of barium, a solid solution of the rare-earth element can be formed even within crystal grains, and hence, a perovskite crystal structure of a cubic system can be formed within the crystal grains. The solid solution of the rare-earth element in the barium titanate crystal enhances the effects of charge compensation for unbalanced charges caused by oxygen vacancies. Thus, the insulating properties of the dielectric ceramic can also be enhanced in this case.

When a dielectric ceramic contains 0.06 moles or less of a rare-earth element (RE) in terms of $RE_2O_3$ per mole of barium, crystal grains containing barium titanate as a main component contain a low amount of the rare-earth element as an impurity and the perovskite crystal grains can maintain their crystal structure. Thus, the dielectric ceramic can exhibit a high relative dielectric constant.

In particular, a dielectric ceramic according to the present invention desirably contains 0.02 to 0.04 moles of magnesium in terms of MgO, 0.01 to 0.03 moles of a rare-earth element (RE) in terms of $RE_2O_3$, and 0 to 0.01 moles of manganese in terms of MnO per mole of barium constituting the dielectric ceramic. This can further enhance the effects of charge compensation for unbalanced charges caused by oxygen vacancies in crystal grains containing barium titanate as a main component, and also can enhance resistance to reduction. Moreover, when such a dielectric ceramic is used for a capacitor, a base metal or the like is readily used for conductor films of the capacitor. In addition to the above specific composition, when crystal grains have a mean diameter of 115 to 145 nm as described below, a dielectric ceramic can have a relative dielectric constant $C_{25}$ at 25° C. of 720 or more and a variation of the relative dielectric constant in the range of −9.5% to 7.5% in the temperature range of −55° C. to 125° C.

The rare-earth element in the present invention refers to at least one element selected from the group consisting of the rare-earth elements of the lanthanide series, which have atomic numbers ranging from 57 to 71, and yttrium (Y). Dy, Ho, Er, and Y are preferable for increasing the relative dielectric constant and enhancing the insulating properties of barium titanate. In particular, Y is more desirable for achieving a high relative dielectric constant.

When the magnesium content in terms of MgO is less than 0.02 moles or the rare-earth element (RE) content in terms of $RE_2O_3$ is less than 0.01 moles per mole of barium, a ratio of magnesium or the rare-earth element forming a solid solution with barium titanate is small. Thus, the crystal grains rarely have a crystal structure of a cubic system and mostly have a tetragonal system. As a result, such a dielectric ceramic has a high relative dielectric constant, but a variation of the relative dielectric constant increases with increase of the relative dielectric constant.

When the magnesium content in terms of MgO is more than 0.064 moles per mole of barium, the Curie temperature of barium titanate is decreased and compounds of magnesium and titanium appear in barium titanate. Thus, an increase in the amounts of these components with low dielectric constants causes the relative dielectric constant to decrease. When the rare-earth element (RE) content in terms of $RE_2O_3$ is more than 0.06 moles, an increase in the amounts of components with low dielectric constants also causes the relative dielectric constant of the dielectric ceramic to decrease.

As described above, crystal grains constituting a dielectric ceramic according to the present invention have a crystal structure of a cubic system, and hence, magnesium and a rare-earth element form a solid solution in all of the barium titanate crystal grains in the present invention. When crystal grains containing barium titanate as a main component have a crystal structure of a cubic system, ferroelectricity caused by a crystal structure of a tetragonal system is reduced and paraelectricity is dominant. Therefore, electrical induction distortion caused by ferroelectricity can be reduced, which is advantageous.

FIG. 1 is a schematic section view of a crystal grain constituting a dielectric ceramic according to the present invention. A ratio ($C_{1/2}/C_{1/4}$) is preferably in the range of 0.75 to 1, and more preferably 0.8 to 1, as shown in the drawing, where $C_{1/2}$ represents a concentration of a rare-earth element in a center 1c of a crystal grain 1 and $C_{1/4}$ represents a concentration of the rare-earth element at a midpoint 1d between the center 1c and the surface of the crystal grain 1. When the ratio ($C_{1/2}/C_{1/4}$) is in the above range, the concentration distribution of the rare-earth element forming a solid solution in the crystal grain 1 containing barium titanate as a main component is close to uniform. Thus, the inside of the crystal grain 1 can substantially have a crystal structure of a cubic system and paraelectricity can be maintained even when the crystal grain 1 has grown. Therefore, a high relative dielectric constant can be achieved, which is advantageous.

The concentration $C_{1/2}$ of a rare-earth element in the centers 1c of the crystal grains 1 and the concentration $C_{1/4}$ of the rare-earth element at the midpoints 1*d* between the centers 1*c* and the surfaces of the crystal grains 1 are measured with a transmission electron microscope (TEM) with an elemental analysis device (EDS) attached thereto on a cross-section of a dielectric ceramic which is polished and subjected to FIB (focused ion beam) machining.

The areas of crystal grains are measured by image processing on the basis of the contours of the grains. The diameters of the grains are calculated as the diameters of circles having the same areas as the grains. Crystal grains that have diameters within the range of ±30% from the mean diameter thereof are selected. The centers 1*c* of crystal grains are defined as the centers of the inscribed circles of the crystal grains. The midpoints 1*d* between the centers 1*c* and the surfaces of the crystal grains 1 are defined as the midpoints, when inscribed circles drawn in the crystal grains touch grain boundaries, between the grain boundaries and the centers 1*c*. The spot size of electron beams is 5 nm in the measuring. For each crystal grain, one analytical value is obtained at the center 1*c* and the other analytical value is obtained at one midpoint 1*d*. Ten crystal grains are analyzed and a mean value is calculated. The inscribed circles of the crystal grains are drawn on an image projected from a transmission electron microscope on the screen of a computer. On the basis of the image on the screen, the centers 1*c* of the crystal grains are determined. A crystal phase is identified by X-ray diffractometry ($2\theta=40°$ to $50°$, Cu—$K_\alpha$).

As described above, a dielectric ceramic according to the present invention includes the crystal grains 1 having a mean diameter in the range of 100 to 145 nm. The crystal grains 1 contain magnesium and a rare-earth element in the barium titanate and have a crystal structure of a cubic system as described above. When the crystal grains 1 are made to have a mean diameter in the above range, such a dielectric ceramic has an increased paraelectricity and a variation of the relative dielectric constant thereof can be reduced and stabilized, which is advantageous. As a result, electrical induction distortion occurring in dielectric ceramics can be reduced in a dielectric ceramic according to the present invention. Use of such a dielectric ceramic for a capacitor for power source circuits can reduce noise that is caused when resonance occurs in the power source circuits. In particular, the crystal grains 1 preferably have a mean diameter of 115 to 145 nm.

When the crystal grains 1 have a mean diameter of less than 100 nm, it is difficult to form perovskite crystal structure of a cubic system in the crystal grains 1, which results in a low relative dielectric constant. When the crystal grains 1 have a mean diameter of more than 145 nm, the crystal grains 1 exhibit ferroelectricity. This increases the relative dielectric constant at room temperature and also the variation of the relative dielectric constant in the range of $-55°$ C. to $125°$ C. That is, the crystal grains exhibit increased ferroelectricity and show electrical induction distortion caused by the ferroelectricity.

The mean diameter of crystal grains is determined as follows. A cross-section of a dielectric ceramic is polished and then etched. The areas of crystal grains are measured by image processing on the basis of the contours of the crystal grains in a micrograph taken with a scanning electron microscope (SEM). The diameters of the grains are calculated as the diameters of circles having the same areas as the grains. A mean value of thus-obtained diameters of about 100 crystal grains is obtained as the mean diameter of the crystal grains.

Figure 3:
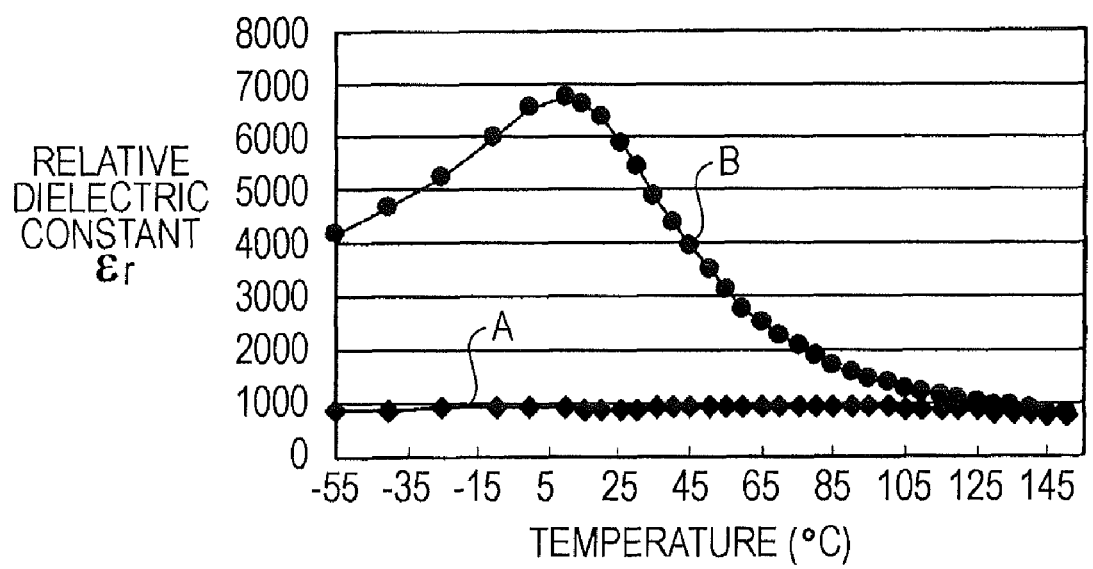
FIG. 3(a) is a graph showing evaluation results of relative dielectric constants of Sample Nos. 1 and 4 in the EXAMPLE.
FIG. 3(b) is a graph showing evaluation results of dielectric loss of these Samples.
Figure 3:
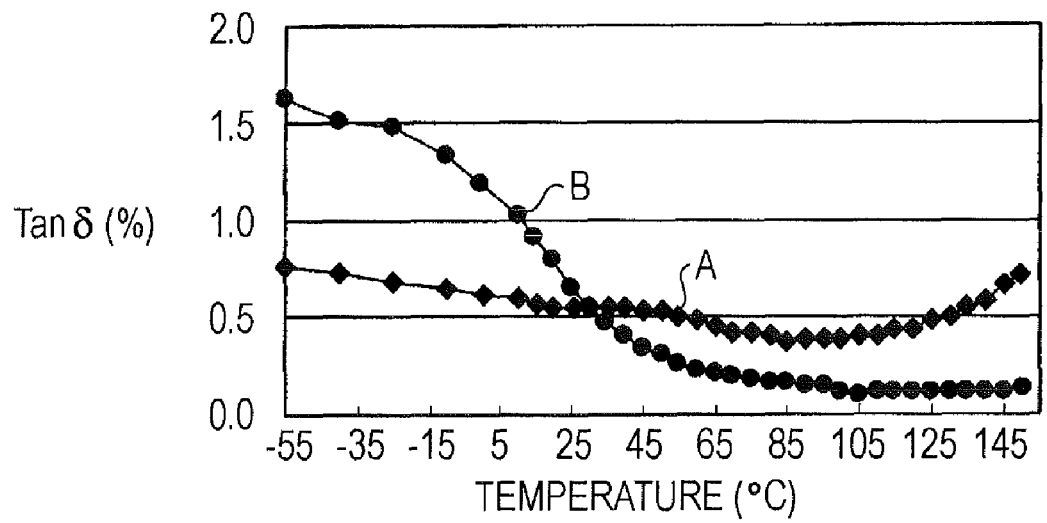

It is known that a phase transition of a ferroelectric material is considerably influenced by the diameters of the crystal grains 1. As described above, by making the crystal grains 1 have a submicron mean diameter, the broad peak corresponding to a paraelectricity-ferroelectricity phase transition at about room temperature is reduced, ferroelectricity is reduced, and variation of the relative dielectric constant is reduced (see FIG. 3).

Since the crystal grains 1 constituting a dielectric ceramic according to the present invention are mainly paraelectric crystal grains, the relative dielectric constant, caused by basic ionic polarization, at temperatures much higher than the phase transition temperature is not changed even when the contribution by phase transition is reduced by a decrease in the grain diameters. Thus, the dependency of the relative dielectric constant on the grain diameters is small in the mean diameter range defined in the present invention. Therefore, when the size of the crystal grains 1 is reduced, only the phase transition peak height is reduced, the relative dielectric constant becomes paraelectric, and temperature dependent variation of the relative dielectric constant can be reduced.

In particular, variation of a relative dielectric constant calculated from a formula $[(C-C_{25})/C_{25}]\times 100$ is desirably within $\pm 10\%$ where the relative dielectric constant $C_{25}$ at $25°$ C. is used as a standard and C represents a relative dielectric constant at a temperature in the temperature range of $-55°$ C. to $125°$ C. In this case, a relative dielectric constant at room temperature ($25°$ C.), namely the relative dielectric constant $C_{25}$, is preferably 650 or more, and more preferably in the range of 720 to 900. The curve representing variation of a relative dielectric constant preferably has two (maximum) peaks in the temperature range of $-55°$ C. to $125°$ C.

The relative dielectric constant is a value obtained by, as described below, shaping a dielectric ceramic into predetermined pellet samples; measuring the samples with an LCR meter (for example, HP4284A or equivalent) at a frequency of 1.0 kHz and at an input signal level of 1.0 V for capacitance and dielectric loss; and calculating the measurement results, the diameter and the thickness of the pellet samples, and the area of a conductor film.

Figure 2:
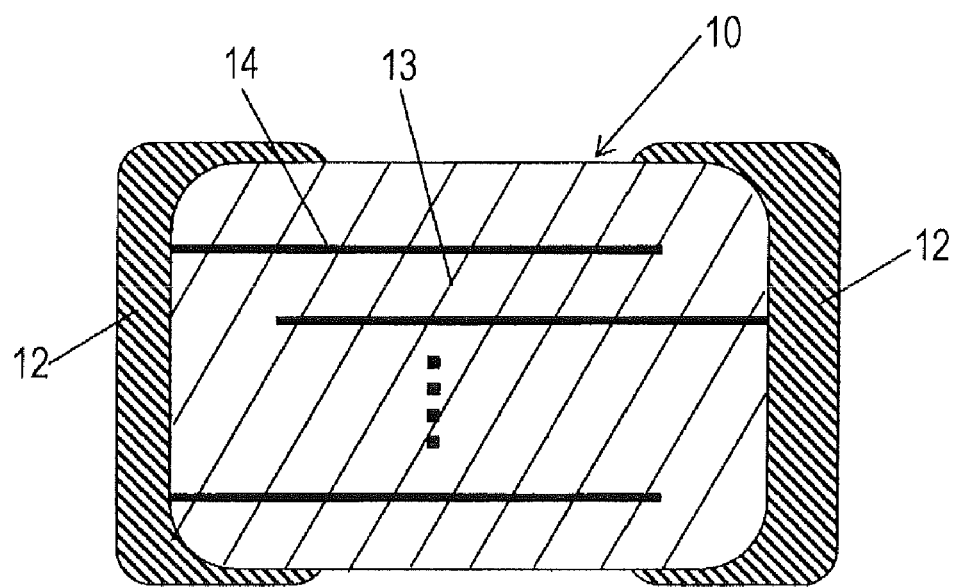
FIG. 2 is a schematic section view of a capacitor according to the present invention.

Next, a capacitor according to the present invention is described in detail with reference to a drawing. FIG. 2 is a schematic section view of a capacitor according to the present invention. As shown in the drawing, the capacitor is constituted by a laminate including a dielectric ceramic according to the present invention as dielectric layers 13 and conductor films as internal electrode layers 14 (conductor layers).

Specifically, the capacitor according to the present invention includes external electrodes 12 at both ends of a laminated capacitor body 10 (laminate). The capacitor body 10 includes the dielectric layers 13 and the conductor layers 14 disposed alternately. The dielectric layers 13 are formed of a dielectric ceramic according to the present invention. The conductor layers 14 function as internal electrode layers. Although FIG. 2 shows a simplified stacked configuration of the dielectric layers 13 and the conductor layers 14, the capacitor according to the present invention includes a laminate constituted by several hundred layers of the dielectric layers 13 and the conductor layers 14.

The dielectric layers 13 preferably have a thickness of 1 μm or more and 5 μm or less. The dielectric layers 13 having a thickness of 5 μm or less are advantageous because use of such thin dielectric layers 13 increases the capacitance of a capacitor.

The conductor layers 14 are desirably formed of a base metal such as Ni or Cu because a large number of the layers can be stacked at a reduced production cost. In particular, Ni is more desirable in view of firing the conductor layers 14 with the dielectric layers 13 constituting a capacitor according to the present invention. The conductor layers 14 preferably have a thickness of 1 μm or less on average.

Since a capacitor according to the present invention includes the above-described dielectric ceramic according to the present invention that exhibits a high relative dielectric constant and a stable temperature characteristic of the relative dielectric constant, such a capacitor can exhibit a higher capacitance and a more stable temperature characteristic of capacitance than known capacitors.

Next, a method for manufacturing a dielectric ceramic according to the present invention is described. Raw materials are prepared: a $BaTiO_3$ powder, a MgO powder, a powder of an oxide of a rare-earth element, and, if desired, a manganese carbonate powder as a manganese component for enhancing resistance to reduction. These raw material powders desirably have a mean particle diameter of 100 nm or less.

As for the composition of a dielectric ceramic, preferably added to barium titanate in terms of $BaTiO_3$ are 0.02 to 0.064 moles of magnesium in terms of MgO, 0.01 to 0.06 moles of a rare-earth element (RE) in terms of $RE_2O_3$, and 0 to 0.013 moles of manganese per mole of barium; more preferably, 0.02 to 0.04 moles of magnesium in terms of MgO, 0.01 to 0.03 moles of a rare-earth element (RE) in terms of $RE_2O_3$, and 0 to 0.01 moles of manganese in terms of MnO per mole of barium. When these additives are in the above-described ranges, a dielectric ceramic according to the present invention can be formed readily.

Then, the raw materials are wet-blended in a predetermined proportion and calcined at a temperature of 1000° C. to 1100° C. to provide a calcined powder. The calcined powder is pulverized so that the mean grain diameter thereof is 100 nm or less, subsequently formed into pellets and fired in air or in a reducing atmosphere. The firing temperature is desirably in the range of 1100° C. to 1300° C. because grain growth of the crystal grains 1 is insignificant in this temperature range. In the present invention, hot pressing is preferably used because it allows for densification of a dielectric ceramic and suppression of growth of crystal grains.

Alternatively, the calcined powder may be prepared with only a portion of a predetermined amount of a rare-earth element oxide powder and the resultant calcined powder and the remaining rare-earth element oxide may be mixed and fired. In this way, a concentration ratio ($C_{1/2}/C_{1/4}$) of the rare-earth element between the centers $1c$ and the midpoints $1d$ of the crystal grains 1 can be controlled to 1 or less. That is, the ratio ($C_{1/2}/C_{1/4}$) can be controlled in the range of 0.75 to 1.

A capacitor may be manufactured by preparing green sheets with the calcined powder; preparing a conductor paste that mainly contains a base metal and will form conductor films after being fired; applying the conductor paste to the surfaces of the green sheets by printing; and subsequently stacking and firing the green sheets.

Hereinafter, the present invention is described in further detail with reference to EXAMPLE; however, the present invention is not restricted to EXAMPLE below.

Example

Preparation of Dielectric Ceramic

Dielectric ceramics (Sample Nos. 1 to 30 in Table 1) were prepared by adding additives (magnesium, a rare-earth element, and manganese) to barium titanate ($BaTiO_3$) in the combinations shown in Table 1 and firing the resultant mixtures. Specifically, powder mixtures were prepared by adding additives in the amounts shown in Table 1 to $BaTiO_3$ powders per molar part of barium of the $BaTiO_3$ powders, which had been synthesized in advance to have a mean particle diameter of 100 nm (200 nm for Sample No. 2). Then, the powder mixtures were calcined at a temperature of 1050° C. for 2 hours to provide calcined powders.

The resultant calcined powders were pulverized so that the mean grain diameters were 80 nm (65 nm for Sample No. 11 calcined powder) and subsequently formed into pellets having a diameter of 12 mm and a thickness of 1 mm. For Sample Nos. 27 and 28, concentration ratios ($C_{1/2}/C_{1/4}$) of the rare-earth element between the centers $1c$ and the midpoints $1d$ of the crystal grains 1 were changed by further adding the rare-earth element oxide to calcined powders to which the rare-earth element had been added in advance to achieve the contents shown in Table 1.

Then, several pellets for each composition were fired at temperatures of 1050° C. to 1450° C. The firing was conducted under normal pressure in a reducing nitrogen atmosphere or by hot pressing in a reducing atmosphere using nitrogen atmosphere. The pressure in the hot pressing was 100 MPa. A carbon jig was used in the hot pressing. Conductor films of indium gallium were printed on the surfaces of the sintered samples to obtain dielectric ceramic samples (Sample Nos. 1 to 30 in Table 1) for evaluation.

<Evaluation>

The compositions of thus-prepared dielectric ceramic samples were analyzed by ICP analysis and atomic absorption spectroscopy. Specifically, each resultant dielectric ceramics was mixed with boric acid and sodium carbonate, and the mixture was melted and dissolved in hydrochloric acid. The resultant solution was qualitatively analyzed by atomic absorption spectroscopy for elements contained in the dielectric ceramic. Then, the identified elements were quantified by ICP emission spectroscopy using standard samples obtained by diluting standard solutions of the elements. The amounts of oxygen were measured with the assumption that the elements had valences shown in the periodic table. The resultant compositions of the samples matched with the compositions shown in Table 1.

The samples were further evaluated for mean diameters of crystal grains, distribution states of the rare-earth elements, crystal structures, relative dielectric constants, and variations of the relative dielectric constants. The methods of these evaluations are described below and the results are shown in Table 2.

(Mean Diameter of Crystal Grains)

The mean diameter of crystal grains of a dielectric ceramic was measured in the following manner. A cross-section of the dielectric ceramic was polished. After that, a micrograph of the microstructure of the cross-section was taken with a scanning electron microscope. Then, the areas of the crystal grains in the micrograph were measured by image processing on the basis of the contours of the grains. The diameters of the grains were calculated as the diameters of circles having the same areas as the grains. A mean value of thus-obtained diameters of about 100 crystal grains was calculated.

(Distribution State of Rare-Earth Element)

The concentration $C_{1/2}$ of a rare-earth element in the centers $1c$ of the crystal grains 1 and the concentration $C_{1/4}$ of the rare-earth element at the midpoints $1d$ between the centers $1c$ and the surfaces of the crystal grains 1 were measured with a transmission electron microscope (TEM) including an elemental analysis device (EDS) for a cross-section of a dielectric ceramic which had been polished and subjected to FIB machining.

The crystal grains were selected in the following manner. The areas of the crystal grains were measured by image processing on the basis of the contours of the grains. The diameters of the grains were calculated as the diameters of circles having the same areas as the grains. Crystal grains that had diameters within the range of ±30% from the mean diameter thereof were selected. The spot size of electron beams was 5 nm in the measuring. For each crystal grain, one analytical value was obtained at the center $1c$ and the other analytical value was obtained at one midpoint $1d$. Ten crystal grains were analyzed and a mean value was calculated. The inscribed circles of the crystal grains were drawn on an image projected from a transmission electron microscope on the screen of a computer. On the basis of the image on the screen, the centers $1c$ of the crystal grains were determined.

(Crystal Structure)

A crystal structure, namely a crystal phase, was identified by X-ray diffractometry (2θ=40° to 50°, Cu—$K_\alpha$). In this identification, a sample whose X-ray diffraction pattern (corresponding to FIG. 4(a)) in which diffraction peaks of the (002) plane and the (200) plane were not clearly separated was assumed to have a cubic system. A sample (corresponding to FIG. 4(b)) that gave diffraction peaks of the (002) plane and the (200) plane clearly separated from each other was assumed to have a tetragonal system.

(Relative Dielectric Constant and Variation of Relative Dielectric Constant)

The capacitance and dielectric loss were measured with an LCR meter HP4284A at a frequency of 1.0 kHz and at an input signal level of 1.0 V. A relative dielectric constant $C_{25}$ at 25° C. was calculated from the measurement results, the diameter and the thickness of the sample, and the area of a conductor film. The variation of the relative dielectric constant was measured in the range of −55° C. to 125° C.

Specifically, in measuring the relative dielectric constant and variation of the relative dielectric constant, average values of ten samples were determined. The variation of a relative dielectric constant was calculated with a formula [(C−$C_{25}$)/$C_{25}$]×100. In Table 2, + side maximum refers to a ratio of the largest relative dielectric constant in the above-described temperature range on the basis of the relative dielectric constant at 25° C. while − side maximum refers to a ratio of the smallest relative dielectric constant on the basis of the relative dielectric constant at 25° C. In Table 2, "Presence of W peaks" refers to whether a curve representing the variation of a relative dielectric constant had two (maximum) peaks in the temperature range of −55° C. to 125° C. or not.

TABLE 1

| Sample No.[1] | Magnesium (MgO) Addition amount Molar part | Rare-earth element ($RE_2O_3$) Type | Rare-earth element ($RE_2O_3$) Addition amount Molar part | Manganese ($MnCO_3$) Addition amount Molar part | Firing conditions[2] Normal pressure, HP | Firing conditions[2] Temperature ° C. |
|---|---|---|---|---|---|---|
| 1 | 0.02 | $Y_2O_3$ | 0.01 | 0.01 | HP | 1150 |
| *2 | 0.02 | $Y_2O_3$ | 0.01 | 0.01 | HP | 1200 |
| 3 | 0.02 | $Y_2O_3$ | 0.01 | 0.005 | HP | 1150 |
| *4 | 0.02 | $Y_2O_3$ | 0.01 | 0.01 | Normal pressure | 1450 |
| 5 | 0.04 | $Y_2O_3$ | 0.03 | 0.013 | HP | 1250 |
| 6 | 0.064 | $Y_2O_3$ | 0.03 | 0.013 | HP | 1250 |
| *7 | 0.02 | $Y_2O_3$ | 0 | 0.01 | HP | 1200 |
| *8 | 0.05 | $Y_2O_3$ | 0.07 | 0.013 | HP | 1200 |
| *9 | 0.011 | $Y_2O_3$ | 0.008 | 0.005 | HP | 1150 |
| 10 | 0.02 | $Y_2O_3$ | 0.01 | 0 | HP | 1150 |
| *11 | 0.02 | $Y_2O_3$ | 0.01 | 0 | HP | 1050 |
| 12 | 0.02 | $Dy_2O_3$ | 0.01 | 0.01 | HP | 1150 |
| 13 | 0.02 | $Ho_2O_3$ | 0.01 | 0.01 | HP | 1150 |
| 14 | 0.02 | $Er_2O_3$ | 0.01 | 0.01 | HP | 1150 |
| 15 | 0.03 | $Y_2O_3$ | 0.01 | 0.01 | HP | 1200 |
| 16 | 0.03 | $Dy_2O_3$ | 0.01 | 0.01 | HP | 1200 |
| 17 | 0.03 | $Ho_2O_3$ | 0.01 | 0.01 | HP | 1200 |
| 18 | 0.03 | $Er_2O_3$ | 0.01 | 0.01 | HP | 1200 |
| 19 | 0.03 | $Y_2O_3$ | 0.02 | 0.01 | HP | 1200 |
| 20 | 0.03 | $Dy_2O_3$ | 0.02 | 0.01 | HP | 1200 |
| 21 | 0.03 | $Ho_2O_3$ | 0.02 | 0.01 | HP | 1200 |
| 22 | 0.03 | $Er_2O_3$ | 0.02 | 0.01 | HP | 1200 |
| 23 | 0.02 | $Y_2O_3$ | 0.04 | 0.01 | HP | 1200 |
| 24 | 0.02 | $Y_2O_3$ | 0.06 | 0.01 | HP | 1200 |
| 25 | 0.04 | $Y_2O_3$ | 0.04 | 0.01 | HP | 1250 |
| 26 | 0.04 | $Y_2O_3$ | 0.03 | 0.01 | HP | 1300 |
| 27 | 0.04 | $Y_2O_3$ | 0.03 | 0.01 | HP | 1250 |
| 28 | 0.04 | $Y_2O_3$ | 0.05 | 0.01 | HP | 1200 |
| *29 | 0.07 | $Y_2O_3$ | 0.03 | 0.013 | HP | 1250 |
| *30 | 0.064 | $Y_2O_3$ | 0.07 | 0.013 | HP | 1250 |

[1] * denotes a sample not in the scope of the present invention.
[2] Normal pressure denotes firing under normal pressure. HP denotes firing by hot pressing.

TABLE 2

| Sample No.[1] | Mean diameter of crystal grains nm | Distribution state of rare-earth element $C_{1/2}/C_{1/4}$[2] | Crystal Structure | Relative dielectric constant $C_{25}$ at 25° C. | Presence of W peaks | Variation of relative dielectric constant +side maximum % | Variation of relative dielectric constant −side maximum % |
|---|---|---|---|---|---|---|---|
| 1 | 130 | 1 | Cubic system | 900 | Present | 4.5 | −6 |
| *2 | 350 | 1 | Tetragonal system | 1000 | Present | 28 | −18 |

TABLE 2-continued

| Sample No.[1] | Distribution state Mean diameter of crystal grains nm | of rare-earth element $C_{1/2}/C_{1/4}$[2] | Crystal Structure | Relative dielectric constant $C_{25}$ at 25° C. | Variation of relative dielectric constant Presence of W peaks | +side maximum % | −side maximum % |
|---|---|---|---|---|---|---|---|
| 3 | 120 | 1 | Cubic system | 850 | Present | 4 | −6.5 |
| *4 | 1300 | 1 | Tetragonal system | 6300 | None | 13.3 | −83.3 |
| 5 | 100 | 1 | Cubic system | 700 | Present | 2.5 | −8.5 |
| 6 | 110 | 1 | Cubic system | 650 | Present | 2 | −9 |
| *7 | 150 | — | Tetragonal system | 1400 | Present | 2.5 | −22 |
| *8 | 100 | 1 | Cubic system | 180 | None | 21 | −24 |
| *9 | 170 | 1 | Tetragonal system | 1500 | Present | 23 | −24 |
| 10 | 130 | 1 | Cubic system | 890 | Present | 5 | −7 |
| *11 | 80 | 1 | Cubic system | 280 | None | 4 | −5 |
| 12 | 130 | 1 | Cubic system | 890 | Present | 5 | −6.5 |
| 13 | 130 | 1 | Cubic system | 850 | Present | 4 | −5 |
| 14 | 130 | 1 | Cubic system | 840 | Present | 4 | −5.5 |
| 15 | 120 | 1 | Cubic system | 820 | Present | 3.8 | −5 |
| 16 | 120 | 1 | Cubic system | 800 | Present | 4 | −4.5 |
| 17 | 120 | 1 | Cubic system | 790 | Present | 4 | −4.5 |
| 18 | 115 | 1 | Cubic system | 790 | Present | 3.7 | −4 |
| 19 | 120 | 1 | Cubic system | 820 | Present | 4.5 | −4.5 |
| 20 | 120 | 1 | Cubic system | 820 | Present | 4 | −4.5 |
| 21 | 120 | 1 | Cubic system | 800 | Present | 4 | −4 |
| 22 | 120 | 1 | Cubic system | 790 | Present | 3.5 | −4 |
| 23 | 120 | 1 | Cubic system | 700 | Present | 3.5 | −9.5 |
| 24 | 120 | 1 | Cubic system | 670 | Present | 5 | −10 |
| 25 | 115 | 1 | Cubic system | 650 | Present | 3 | −10 |
| 26 | 145 | 1 | Cubic system | 850 | Present | 7.5 | −9.5 |
| 27 | 120 | 0.83 | Cubic system | 720 | Present | 2 | −4 |
| 28 | 110 | 0.75 | Cubic system | 660 | Present | 2 | −3.5 |
| *29 | 100 | 1 | Cubic system | 420 | Present | 2 | −8.5 |
| *30 | 100 | 1 | Cubic system | 430 | Present | 3 | −8 |

[1] * denotes a sample not in the scope of the present invention.
[2] $C_{1/2}/C_{1/4}$ denotes a ratio of the concentration ($C_{1/2}$) of a rare-earth element in the centers of crystal grains to the concentration ($C_{1/4}$) of the rare-earth element at the midpoints between the centers and the surfaces of the crystal grains.

The results in Tables 1 and 2 clearly show that the resultant dielectric ceramics (Sample Nos. 1, 3, 5, 6, 10, and 12 to 28) according to the present invention all exhibit crystal structures of a cubic system by X-ray diffractometry, relative dielectric constants $C_{25}$ at 25° C. of 650 or more, and variations of the relative dielectric constants within ±10% in the range of −55° C. to 125° C. These results demonstrated that the dielectric ceramics according to the present invention were samples exhibiting high relative dielectric constants, stable temperature characteristics of the relative dielectric constants, and small electrical induction distortion.

Sample Nos. 1, 3, 10, 12 to 22, 26, and 27 contained 0.02 to 0.04 moles of magnesium in terms of MgO, 0.01 to 0.03 moles of rare-earth elements (RE) in terms of $RE_2O_3$, and 0 to 0.01 moles of manganese in terms of MnO per mole of barium constituting the dielectric ceramics and the crystal grains thereof had a mean diameter of 115 to 145 nm. These samples exhibited relative dielectric constants $C_{25}$ at 25° C. of 720 or more and variations of the relative dielectric constants of −9.5% to 7.5% in the range of −55° C. to 125° C., which were particularly good results.

In contrast, Sample No. 2, which included crystal grains having a mean diameter of 350 nm, exhibited a tetragonal system by X-ray diffractometry and a high relative dielectric constant $C_{25}$ at 25° C. of 1000, but also larger variations of the relative dielectric constant of +28% and −18% in the range of −55° C. to 125° C. than the samples according to the present invention. Likewise, Sample No. 4, which included crystal grains having a mean diameter of 1300 nm, exhibited a tetragonal system by X-ray diffractometry and a high relative dielectric constant $C_{25}$ at 25° C. of 6300, but larger variations of the relative dielectric constant of +13.3% and −83.3% in the range of −55° C. to 125° C. than the samples according to the present invention. Sample No. 11, which included crystal grains having a mean diameter of 80 nm, exhibited a cubic system by X-ray diffractometry and a low relative dielectric constant $C_{25}$ at 25° C. of 280.

Sample Nos. 7 to 9, 29, and 30, which contained magnesium or a rare-earth element in amounts not satisfying the scope of the present invention, exhibited low relative dielectric constants $C_{25}$ at 25° C. or large temperature dependent variations of the relative dielectric constants. Thus, these dielectric ceramics were verified to have electrical induction distortion.

Hereinafter, EXAMPLE is described in further detail. FIG. 3(a) is a graph showing variations of relative dielectric constants in the range of −55° C. to 125° C. FIG. 3(b) is a graph showing variations of dielectric losses in the range of −55° C. to 125° C. In the graphs, the curves designated by A correspond to Sample No. 1, which was an example of a dielectric ceramic according to the present invention. The curves designated by B correspond to Sample No. 4, which was a comparative example and had a mean grain diameter of 1300 nm.

The curves designated by A, which correspond to Sample No. 1 dielectric ceramic, give the following findings. As a result of making barium titanate contain predetermined amounts of the above-described elements, phase transition peaks of barium titanate, which inherently appear at room temperature and near 125° C., shift to the lower temperature side and a diffuse phase transition as in relaxor dielectrics appears at temperatures of 25° C. or less. As a result of a phase transition peak being shifted to about 25° C. and the phase transition being diffused, ferroelectricity in the temperature region higher than 25° C. is suppressed and paraelectric characteristics tend to be exhibited. In this case, by decreasing the phase transition temperature, paraelectricity is exhibited in the temperature region higher than 25° C., which reduces dielectric loss. Thus, a dielectric ceramic having a small variation of the relative dielectric constant can be provided.

The present invention shows that the temperature characteristic of a relative dielectric constant depends on the content of magnesium rather than the contents of rare-earth elements and manganese. However, a decrease in phase transition temperature and diffusing of phase transition are not achieved by just replacing Ti in $BaTiO_3$ with Mg in a dielectric ceramic shown in above-mentioned Non-patent Document 1. In the present invention, the above-described dielectric characteristics are achieved presumably by forming a solid solution of a rare-earth element within crystal grains.

Figure 4:
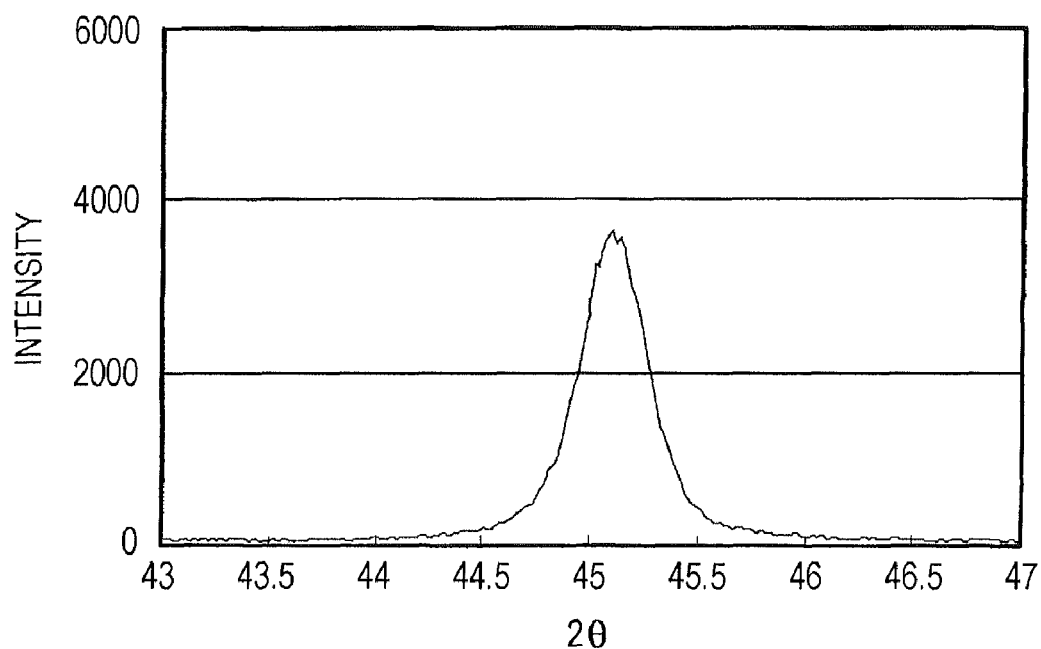
FIG. 4(a) is a graph showing an X-ray diffraction pattern result of Sample No. 1 in the EXAMPLE.
FIG. 4(b) is a graph showing an X-ray diffraction pattern result of Sample No. 4 in the EXAMPLE.
Figure 4:
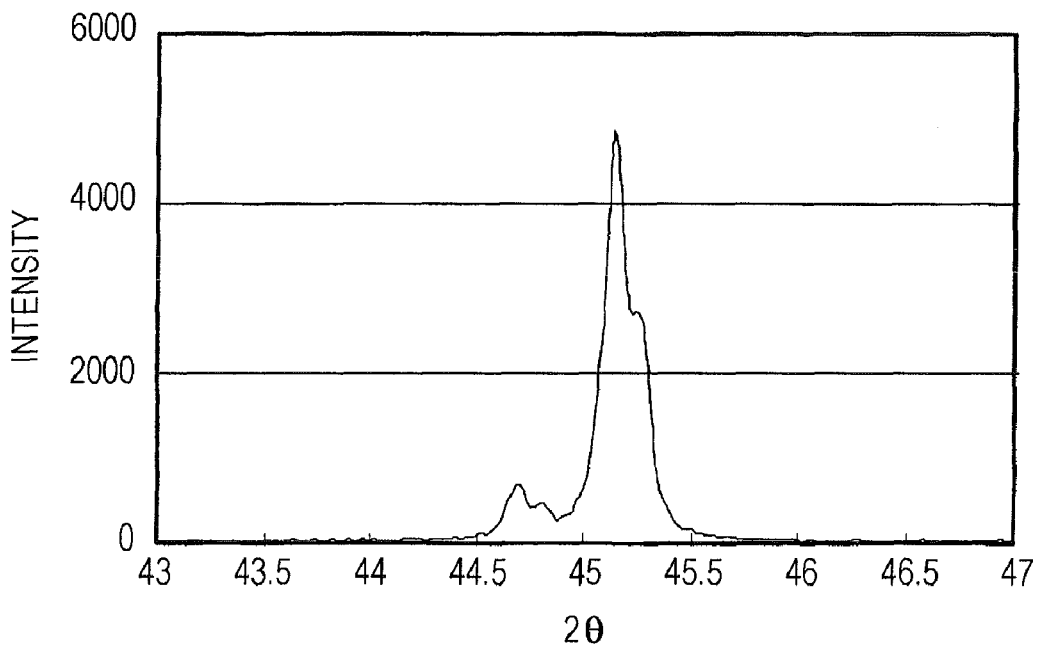

FIG. 4(a) is an X-ray diffraction pattern of a dielectric ceramic (Sample No. 1) according to the present invention that includes crystal grains whose internal crystal structure is a cubic system. FIG. 4(b) is an X-ray diffraction pattern of an existing dielectric ceramic (Sample No. 4) whose internal crystal structure is a tetragonal system.

In FIG. 4(a), there is one peak near $2\theta=45°$. In FIG. 4(b), there are peaks near $2\theta=44.7°$ and $2\theta=45.2°$. That is, since only one peak was found near $2\theta=45°$ by X-ray diffractometry, the dielectric ceramic according to the present invention was verified to have a cubic system. In contrast, since two peaks were found in FIG. 4(b), a tetragonal system was verified.

Figure 5:
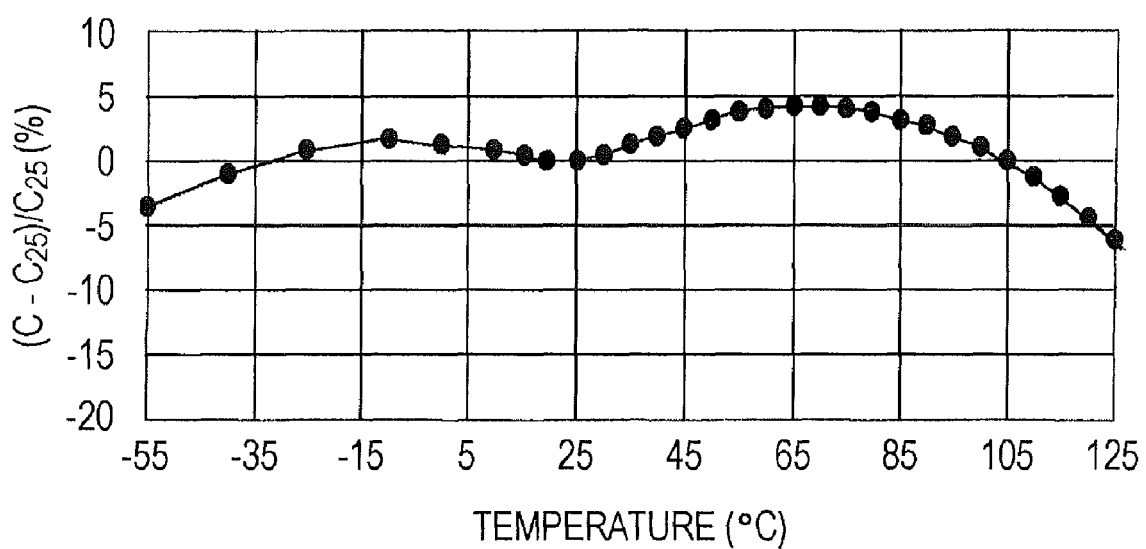
FIG. 5 is a graph showing a variation of a relative dielectric constant of Sample No. 1 in the temperature range of −55° C. to 125° C. in EXAMPLE.

FIG. 5 is a graph (Sample No. 1) representative of graphs showing variations of relative dielectric constants of dielectric ceramics according to the present invention in the range of −55° C. to 125° C. FIG. 5 represents $(C-C_{25})/C_{25}$ where C represents a relative dielectric constant in the range of −55° C. to 125° C. and $C_{25}$ represents the relative dielectric constant at 25° C. The dielectric ceramic (Sample No. 1) includes crystal grains containing barium titanate as a main component. The curve representing a variation of the relative dielectric constant of the dielectric ceramic in the temperature range of −55° C. to 125° C. has two maximum peaks with a boundary at 25° C.

Since the dielectric ceramic (Sample No. 1) according to the present invention is constituted by crystal grains predominantly exhibiting paraelectricity, the dielectric ceramic can have a small temperature dependent variation of the relative dielectric constant as described above. When the curve has two maximum peaks with a boundary at 25° C., the variation of the relative dielectric constant can be further reduced.

The invention claimed is:

1. A dielectric ceramic comprising crystal grains comprising barium titanate as a main component and magnesium and a rare-earth element, wherein the dielectric ceramic contains 0.02 to 0.064 moles of magnesium in terms of MgO and 0.01 to 0.06 moles of the rare-earth element (RE) in terms of $RE_2O_3$ per mole of barium constituting the dielectric ceramic; the crystal grains have a crystal structure of a cubic system; and the crystal grains have a mean diameter of 100 to 145 nm;
   wherein the dielectric ceramic exhibits a single peak in X-ray diffraction analysis at 2θ between 44.5° and 45.5°.

2. The dielectric ceramic according to claim 1, wherein the dielectric ceramic contains 0.02 to 0.04 moles of the magnesium in terms of MgO, 0.01 to 0.03 moles of the rare-earth element (RE) in terms of $RE_2O_3$, and 0 to 0.01 moles of manganese in terms of MnO per mole of barium constituting the dielectric ceramic; and the crystal grains have a mean diameter of 115 to 145 nm.

3. The dielectric ceramic according to claim 1, wherein a ratio ($C_{1/2}/C_{1/4}$) is 0.75 to 1 where $C_{1/2}$ represents a concentration of the rare-earth element in the centers of the crystal grains and $C_{1/4}$ represents a concentration of the rare-earth element at midpoints between the centers and surfaces of the crystal grains.

4. A capacitor comprising a laminate including dielectric layers and conductor layers disposed alternately, wherein the dielectric layers include the dielectric ceramic according to claim 1.

5. The dielectric ceramic according to claim 2, wherein a ratio ($C_{1/2}/C_{1/4}$) is 0.75 to 1 where $C_{1/2}$ represents a concentration of the rare-earth element in the centers of the crystal grains and $C_{1/4}$ represents a concentration of the rare-earth element at midpoints between the centers and surfaces of the crystal grains.

6. A capacitor comprising a laminate including dielectric layers and conductor layers disposed alternately, wherein the dielectric layers include the dielectric ceramic according to claim 2.

7. A capacitor comprising a laminate including dielectric layers and conductor layers disposed alternately, wherein the dielectric layers include the dielectric ceramic according to claim 3.

8. The dielectric ceramic according to claim 1 that exhibits a dielectric constant at 25° C. from 650 to 900 with variation in the dielectric constant of ±10% over the temperature range of −55° C. to 125° C.

9. A dielectric ceramic comprising crystal grains comprising barium titanate as a main component and magnesium and a rare-earth element, wherein the dielectric ceramic contains 0.02 to 0.064 moles of magnesium in terms of MgO and 0.01 to 0.06 moles of the rate-earth element (RE) in terms of $RE_2O_3$ per mole of barium constituting the dielectric ceramic; the crystal grains have a crystal structure of a cubic system; and the crystal grains have a mean diameter of 100 to 145 nm;
   wherein the dielectric ceramic exhibits a dielectric constant at 25° C. from 650 to 900 with variation in the dielectric constant of ±10% over the temperature range of −55° C. to 125° C.

* * * * *